C. L. RAYFIELD.
MULTIFLUID MULTIJET CARBURETER.
APPLICATION FILED SEPT. 9, 1913.
1,310,805.
Patented July 22, 1919.
6 SHEETS—SHEET 1.
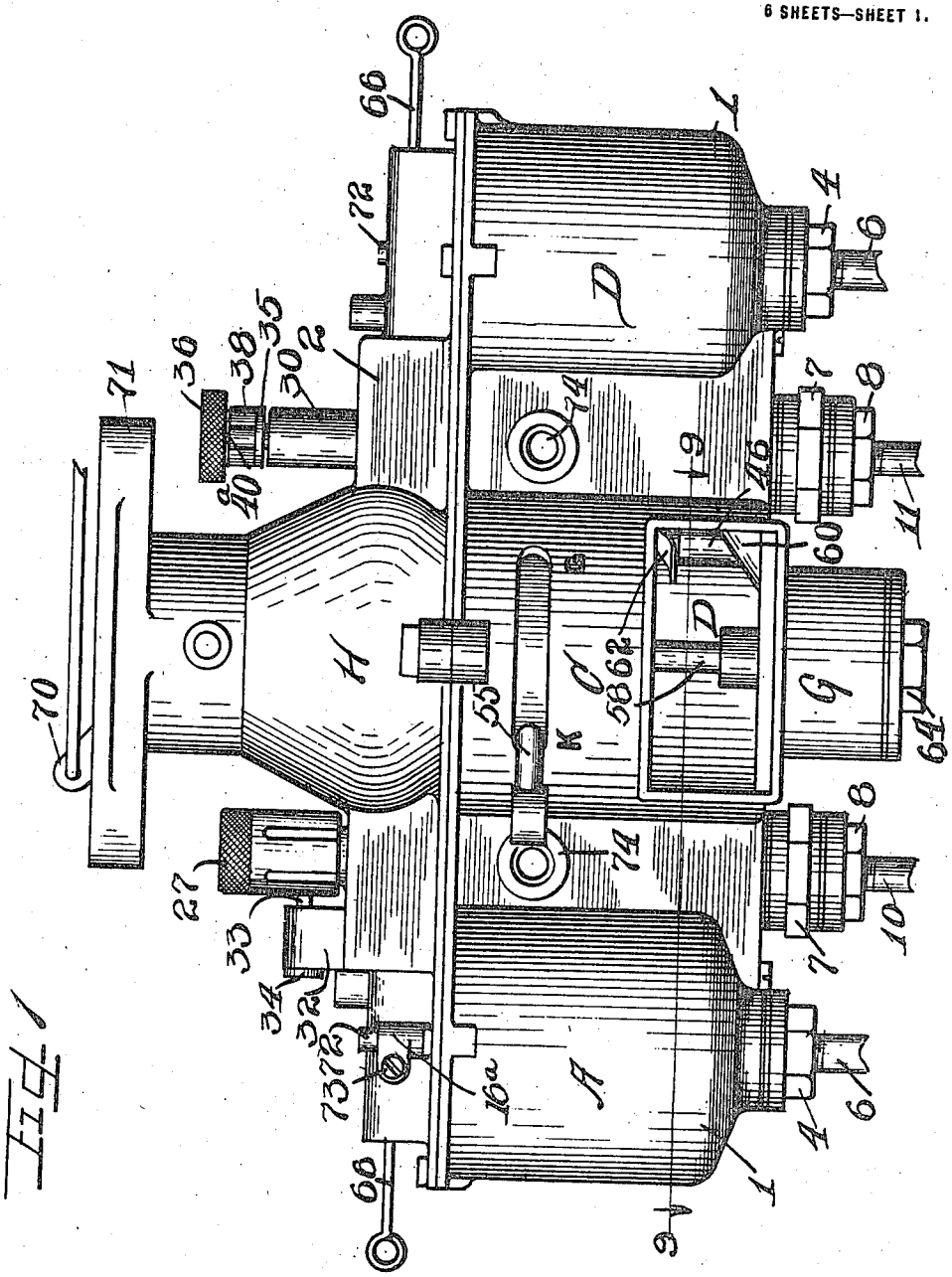

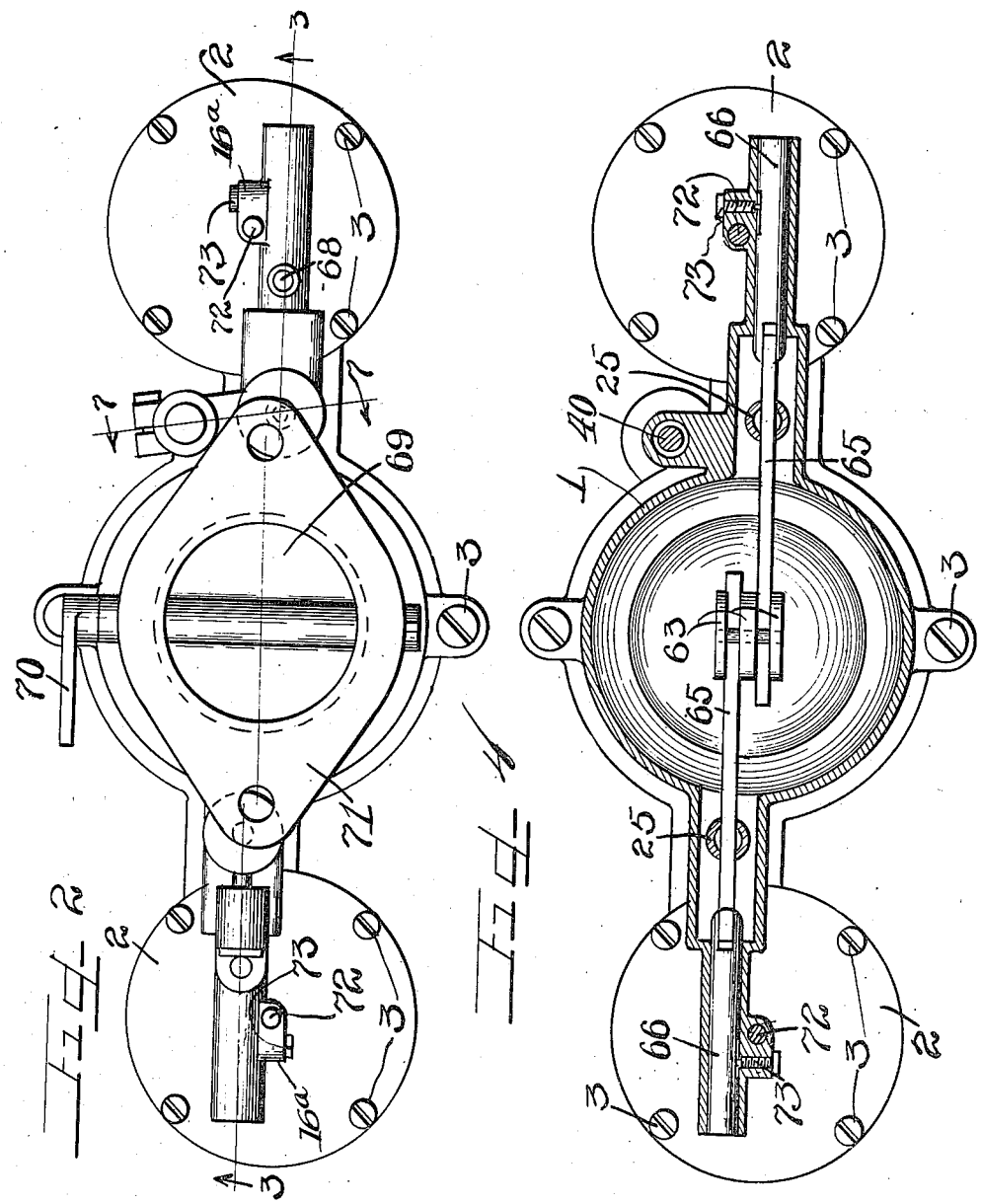

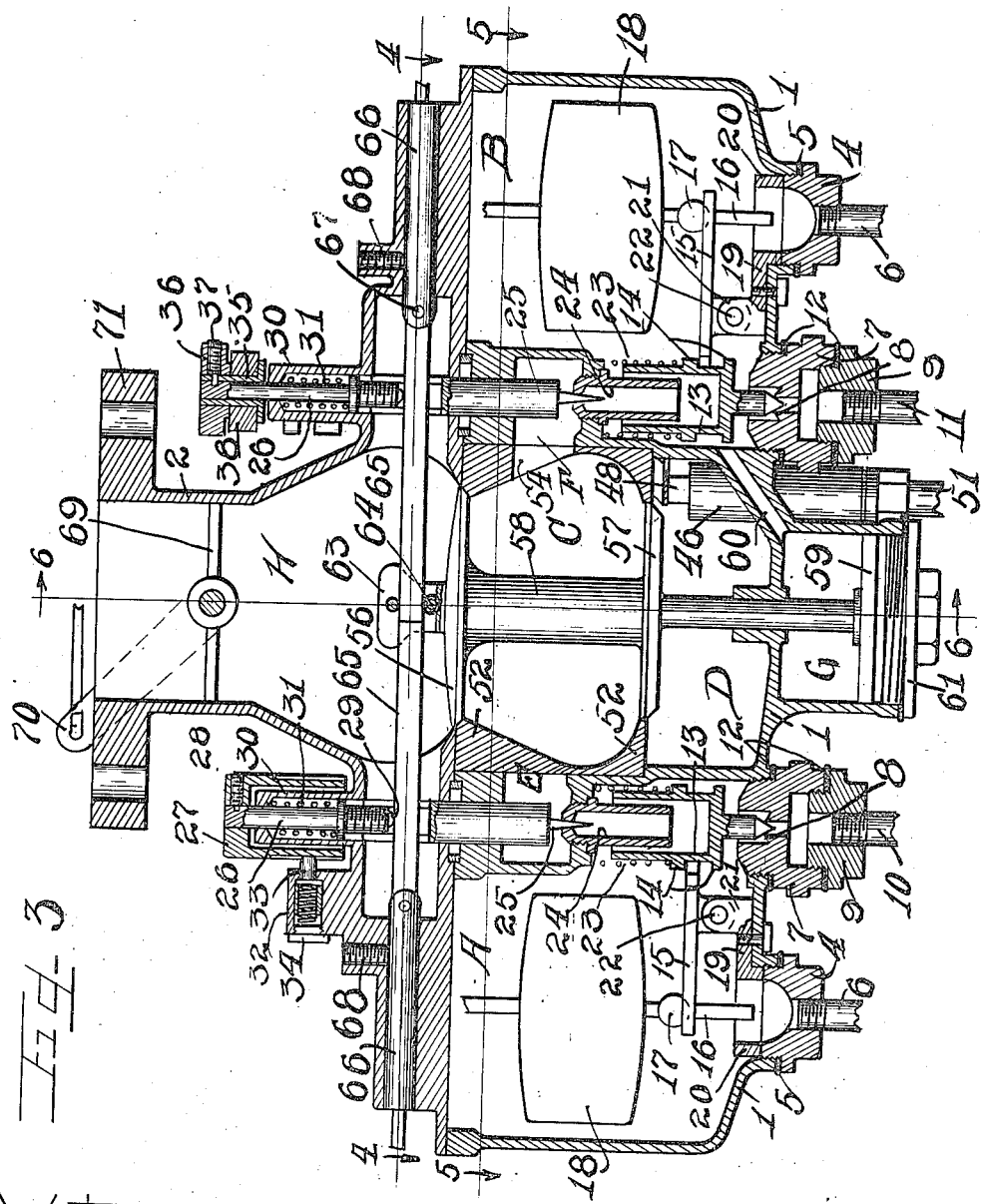

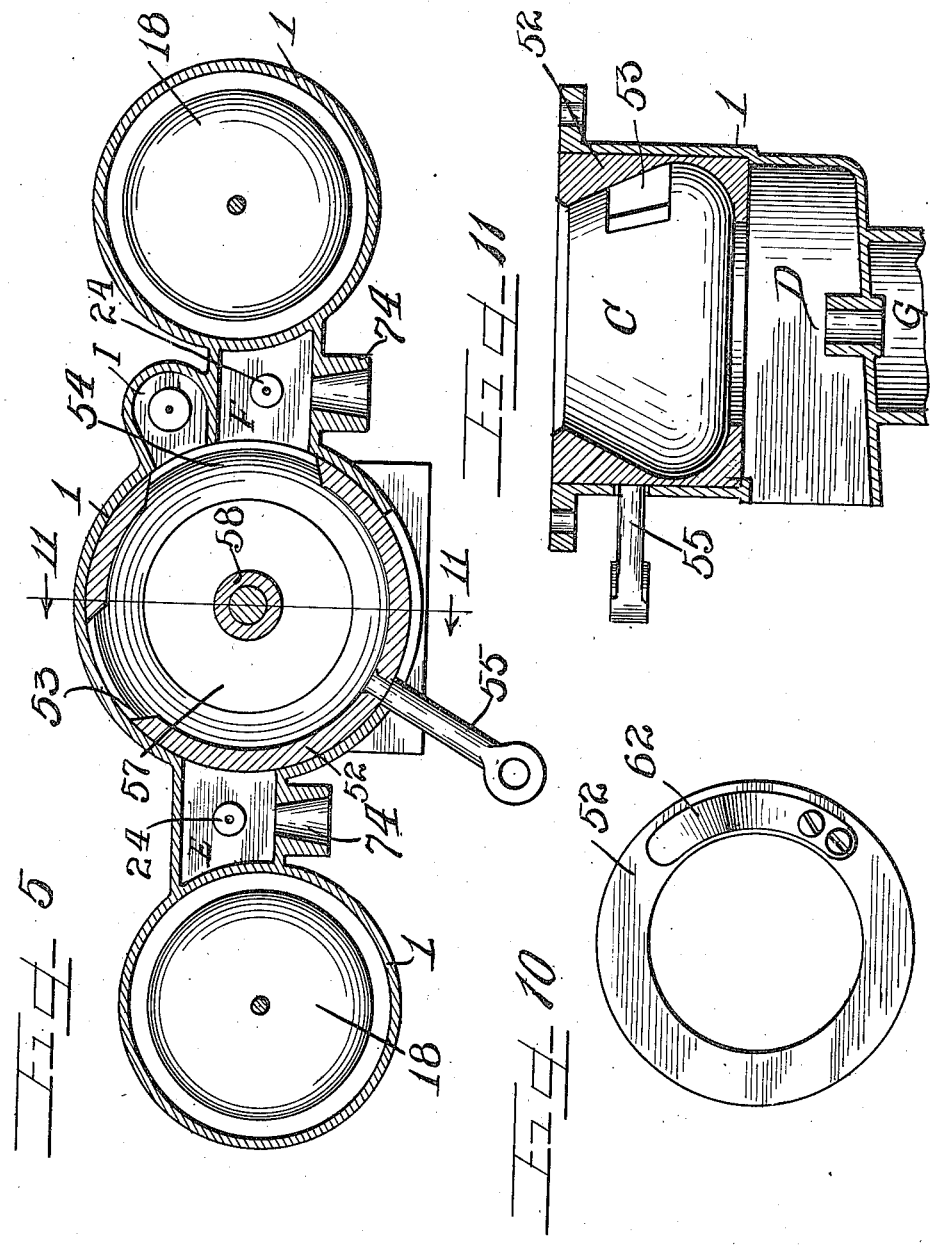

C. L. RAYFIELD.
MULTIFLUID MULTIJET CARBURETER.
APPLICATION FILED SEPT. 9, 1913.
1,310,805.
Patented July 22, 1919.
6 SHEETS—SHEET 5.
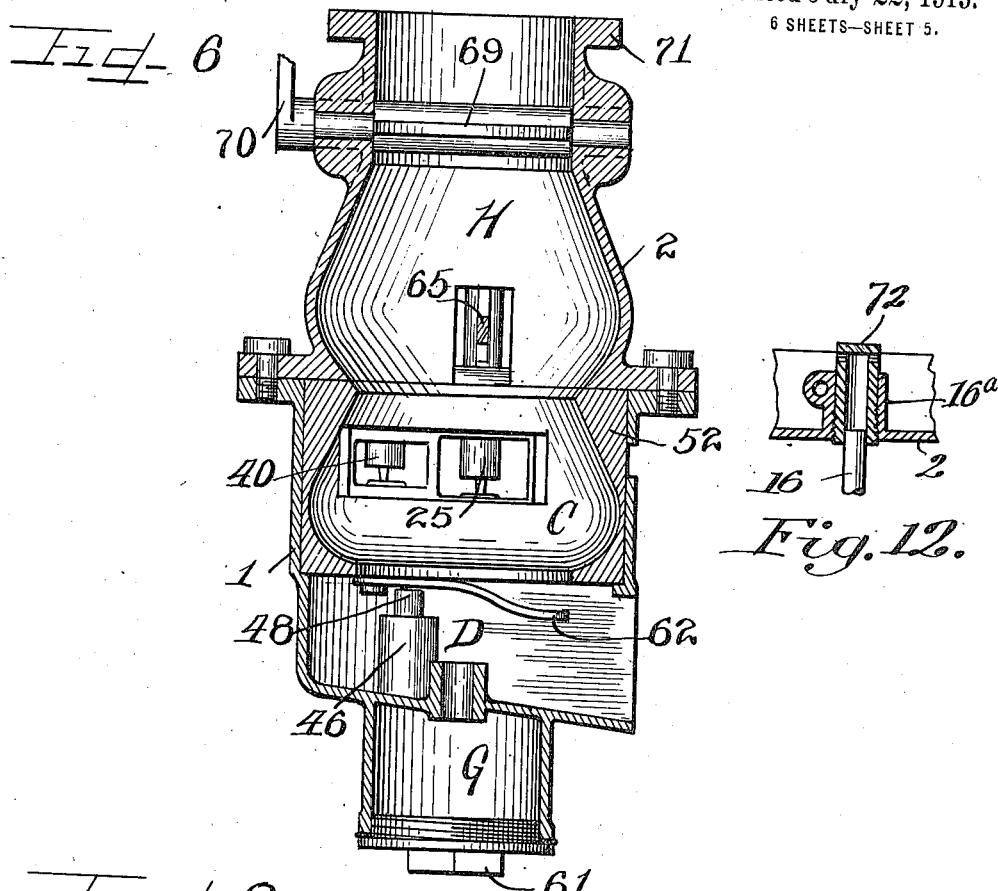
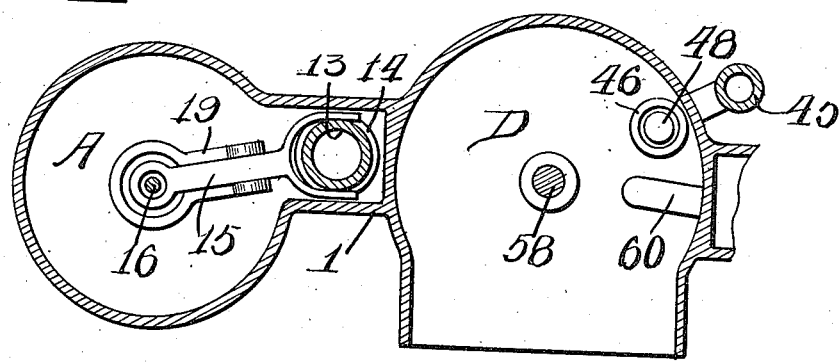

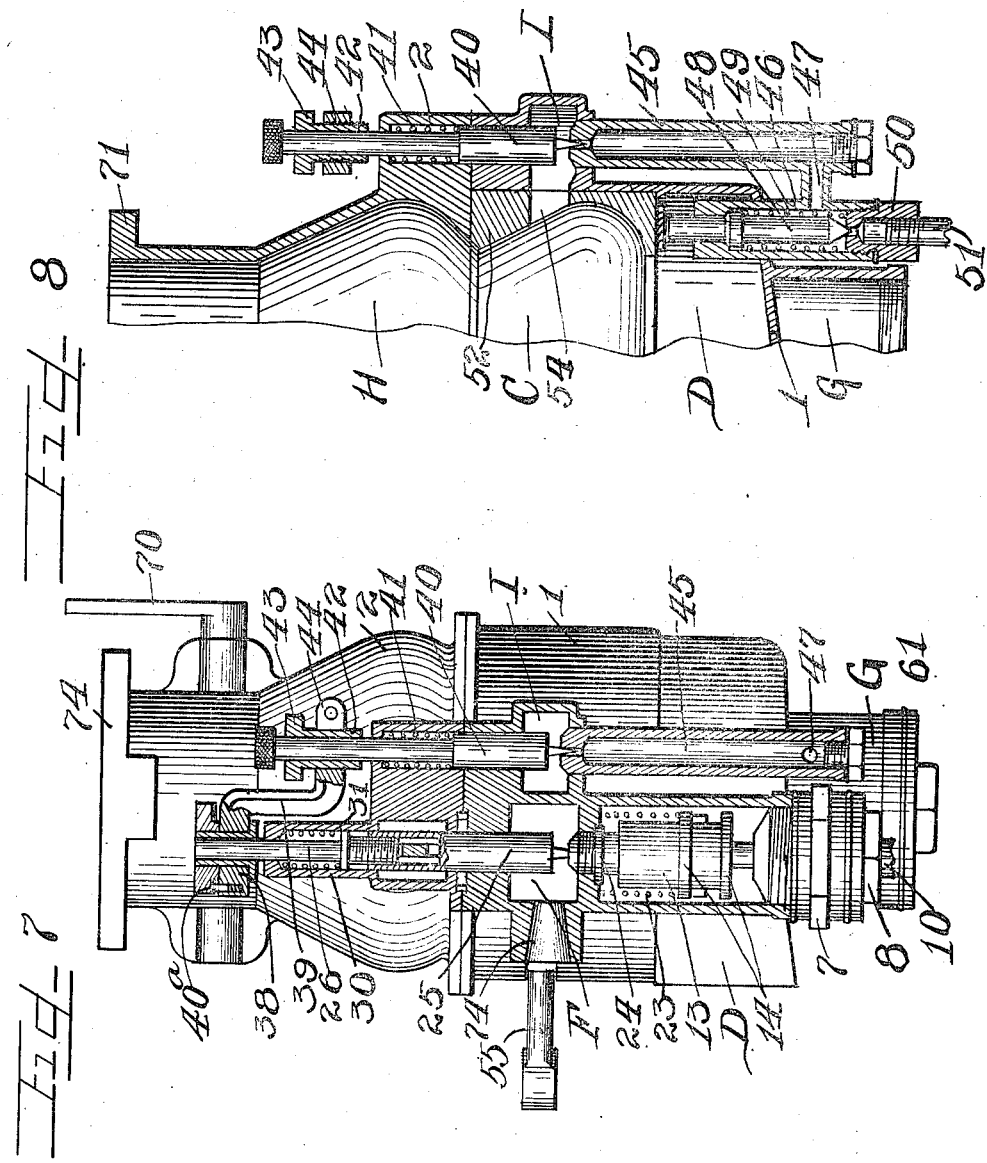

UNITED STATES PATENT OFFICE.

CHARLES L. RAYFIELD, OF CHICAGO, ILLINOIS, ASSIGNOR TO FINDEISEN & KROPF MANUFACTURING COMPANY, OF CHICAGO, ILLINOIS, A CORPORATION OF ILLINOIS.

MULTIFLUID, MULTIJET CARBURETER.

1,310,805.  Specification of Letters Patent.  Patented July 22, 1919.

Application filed September 9, 1913. Serial No. 788,821.

*To all whom it may concern:*

Be it known that I, CHARLES L. RAYFIELD, a citizen of the United States, and a resident of the city of Chicago, in the county of Cook and State of Illinois, have invented certain new and useful Improvements in Multifluid, Multijet Carbureters; and I do hereby declare that the following is a full, clear, and exact description of the same, reference being had to the accompanying drawings, and to the numerals of reference marked thereon, which form a part of this specification.

It is a well known fact that fuels of lower grades are much richer in carbon than the lighter and more readily volatile fluids, and in some cases this fact has proved a serious defect, owing to the deposit of carbon within the engine cylinders, which clogs and pits the valves, and causes the same to stick, thus greatly lowering the efficiency of operation of the device.

This invention relates to a carbureting means wherein a lighter high grade volatile fluid may be first used in starting the engine, and when the same has been run sufficiently long to warm the engine to a normal working condition, mere actuation of a lever serving to cut off the supply of said fluid, and open valves to permit carburation of the air by another lower grade fuel, as well as permitting an introduction of water vapor into the mixture.

It has been found also, that in using low grade fuels containing a high percentage of carbon, the combustion thereof in the presence of water or water vapor, produces a chemical reaction, in which various new combustible gases are formed, which, after the combustion thereof, insure practically complete oxidation of the carbon from the hydrocarbon fuel, and thus obviate carbonization within the cylinders of the engine.

It is also an object of this invention to construct a carbureter having a plurality of sources of feeds for different hydro-carbon fuels, together with a source for the introduction of water vapor, a common mixing chamber for said carbureter adapted to carburet air from either one of said sources of hydro-carbon fuel, and means connecting said water vapor source of supply with one of said hydro-carbon sources of supply to insure a simultaneous opening of each thereof, and simultaneous communication thereof with said common mixing chamber, as well as connected means for adjusting the supply from said sources commensurate with the draft through the mixing chamber afforded by the engine.

It is finally an object of this invention to construct a multi-fluid carbureter adapted to introduce one or another grade of hydrocarbon into a mixing chamber, and, if desired, intermingling water vapor therewith, and in which all the elements are of simple construction and the device is entirely free from complicated mechanisms, and in which a single valve serves to throttle or govern the supply of the charge to the engine irrespective of the grade of hydro-carbon used.

The invention (in a preferred form) is hereinafter more fully described and defined in the accompanying drawings, and specification.

In the drawings:

Figure 1, is a front elevation of a device embodying the principles of my invention.

Fig. 2, is a top plan view thereof.

Fig. 3 is a section taken on line 3—3, of Fig. 2.

Fig. 4 is a section taken on line 4—4, of Fig. 3.

Fig. 5 is a section taken on line 5—5, of Fig. 3, showing parts in elevation.

Fig. 6 is a section taken on line 6—6, of Fig. 3, with the puppet valves omitted.

Fig. 7 is a section taken on line 7—7, of Fig. 2, with parts in elevation.

Fig. 8 is an enlarged, fragmentary section with parts omitted, illustrating the connection between the valves of the double controlled water vapor supply.

Fig. 9 is an enlarged, fragmentary section taken through the face of the carbureter on line 9—9, of Fig. 1.

Fig. 10, is a bottom plan view of the annular rotatable two-way valve, which affords a seat for a puppet valve.

Fig. 11 is an enlarged, fragmentary sectional view taken on line 11—11, of Fig. 5, and with parts omitted.

Fig. 12 is a detail view illustrating the construction at the upper end of the respective float chambers.

As shown in the drawings:

The carbureter comprises an integral casing 1, which affords float feed chambers A and B, a mixing chamber C, an air intake passage or port D, auxiliary carbureting chambers E and F, and a dash pot chamber G. Said casing is closed at its top by a cover member 2, affording a bell shaped chamber H, in register with said mixing chamber C, and is securely attached to said casing 1, by means of cap screws 3. The bottom wall of each of said float chambers A and B respectively, is apertured, and threaded therein is a suitable union 4, with a copper gasket 5, thereon to insure a seal, and a pipe 6, is threaded into said union and provided with any suitable valve (not shown) for draining said float chambers when desired.

At points intermediate said float chambers and said intake chamber D, the lower wall of said casing 1, is apertured and threaded to receive therein a union 7, which is also suitably apertured to afford a valve seat 8. The lower end of said union 7, is provided with an enlarged recess, and threaded therein is a nut 9, which is internally threaded to receive the fuel supply pipes 10 and 11, respectively therein, the one for gasolene, and the other for kerosene.

Of course, any suitable packing gaskets 12, are inserted between said threaded connections to insure a seal therebetween. For the purpose of governing the flow of hydrocarbon fuel to the float chamber through the respective pipes 10 and 11, a needle sleeve valve member 13, is provided, adapted to seat upon said seat 8, and extending upwardly in an offset portion of the float chamber, beneath said auxiliary carbureting chambers E and F. Said valve sleeve element 13, is provided with a pair of peripheral flanges 14, between which engages a yoked lever 15, the other end being provided with an aperture to engage around a float stem 16, secured on which is a spherical anti-friction stop 17, and a spun copper float 18.

A bracket 19, having a circular extension 20, adapted to fit into the aperture in the base of said float chamber, is provided, having a plurality of upstanding lugs 21, with a pintle 22, therethrough to support said pivoted lever 15. Thus, as the level in the float chamber falls, the weight of said float and valve stem will be applied to the outer end of said lever 15, thereby lifting the sleeve needle valve element 13, and permitting an inflow of hydro-carbon fuel to the float feed chamber, until a predetermined level is reached, so that a constant level of hydro-carbon fuel is maintained practically at all times within the float feed chamber.

Threaded into the bottom wall of each of said auxiliary carbureting chambers E and F, is an extended tubular valve seat member 24, which extends downwardly and loosely within the needle valve element 13, and at its upper end affords a seat for a needle valve 25. A coiled spring 23, is wound about said sleeve valve element 13, and bears at one of its ends against the upper flange 14, and at its other end against the under surface of the bottom wall of the respective auxiliary carbureting chambers E and F, to normally thrust said needle valve closure 13, downwardly upon its seat.

The upper end of said needle valve 25, is provided with an axial aperture into which is threaded a stem 26, which at its upper end is rigidly secured in a fluted cap 27, by means of a set screw 28, and at its lower end is provided with an anti-friction ball 29, for a purpose hereinafter described. Said cover member 2, is provided with an upwardly extending tubular portion 30, through which said stem 26, extends and wound about said stem and bearing at one of its ends, against the upper end of said tubular extension 30, and at its lower end upon a flange upon said stem 26, is a spiral compression spring 31, which acts normally to thrust said needle valve downwardly upon its seat.

Mounted in a horizontally apertured upstanding lug 32, is a spring pressed detent 33, adapted to engage in the outer fluted portions of said cap 27, to maintain the same in any one of its adjusted positions, and a cover cap 34, is threaded into said aperture in said lug to contain the actuating elements therein, and affords a stop for one end of the spring pressed detent 33.

The operative mechanisms for the needle valve 25, projecting into the auxiliary carbureting chamber F, are of slightly different construction. However, a stem 26, is threaded into the upper apertured end of said needle valve, and guided in its movement by the tubular member 30, and impelled normally downward by means of the spiral spring 31, as described in the aforesaid needle valve in the carbureting chamber E.

Instead, however, of being secured to a fluted adjusting nut 27, said latter stem 26, is rigidly secured in a sleeve 35, which is rigidly attached to an actuating head 36, by means of a set screw 37, said sleeve 35, being flanged outwardly at its lower end so as to be rotatably confined in the upper extension 38, of a Z member 39. The under surface of said adjusting head 36, is notched, and a spring pressed detent 40ª, is mounted in said element 38, to engage the notches in said head 36, to maintain the same in any adjusted position.

Offset, and on the rear side of said carbureting chamber 1, is an integral needle valve chamber denoted by the reference letter I, and mounted therein is a needle valve 40, the stem of which extends upwardly through a recess in the cover 2, in which is placed a spiral compression spring 41, for the purpose of normally impelling said needle valve downwardly in closed position, and slidable through a sleeve 42, provided with a knurled head 43, said sleeve 42, being threaded into the lower extension 44, of said Z member 39. Thus it is evident that any upward movement of the needle valve 25, in the chamber F, will, due to the Z bar connection 39, cause a correspondingly upward movement of said needle valve 40, and, of course, when said aforesaid needle valve 25, is again lowered to its seat, the needle valve 40, is impelled downwardly upon its seat by said spring 41.

The supply of water governed by said needle valve 40, enters through a tubular member 45, which is tightly secured in an aperture in the lower wall of said chamber I, and at its lower end is integrally connected with another tubular member 46, by means of a communicating passage 47. Said tubular extension 46, projects upwardly into the air intake chamber D, through an aperture in the rear of the lower wall thereof, and mounted in said tubular extension 46, is a needle valve 48, which is normally impelled upwardly into open position by means of a spiral compression spring 49.

A valve seat 50, is threaded into the lower end of said tubular extension 46, for said valve 48, and threaded therein is a water supply pipe 51. Thus a double valve control for the water intake to the carbureter is afforded, the upper valve moving coincidently to open with the hydro-carbon valve, and the lower valve arranged to cut off the flow from said upper valve in a manner hereinafter described. A peripheral flange or shoulder is provided in the inner wall of the carbureter casing between the respective chambers C and D, and resting thereon, and adapted to rotate in said chamber D, (which is of circular shape) is an annular ported valve element 52, provided with a gasolene intake port 53, and water and kerosene intake ports 54. A slot is provided in the front side walls of the mixing chamber, and projecting therethrough is an actuating handle 55, which is rigidly secured on said annular valve element 52, and adapted to throw the same from one position to the other, to admit the respective hydro-carbon fuels into the mixing chamber.

Mounted in the apertures afforded in the upper and lower ends of said valve element 52, are connected puppet valves 56 and 57, the upper of which is adapted to seat upon the upper portion of said valve element 52, and the lower of which is merely slidable through the aperture in said element, though fitting closely therein, and so positioned as to effectually close the lower aperture when said upper valve 56, is in closed position.

A stem 58, connects said valve 56 and 57, and flares outwardly at its upper end in order to direct the charge from the mixing chamber easily around said valve element 56. Secured on the lower narrowed extremity of said stem 58, is a piston 59, which is submerged in hydro-carbon fuel in the dash pot G, which communicates with said float chamber by means of a passage 60, said dash pot serving to prevent fluttering of said valves 56 and 57. The lower end of said dash pot is shown closed by a threaded plug 61, which is suitably packed by means of a copper gasket to prevent leakage.

Secured on the under surface of said valve ported element 52, is a relatively stiff, curved, leaf spring 62, which is downwardly directed at its free extremity, and is so positioned relatively the port 54, in said element 52, that when the handle 55, is thrown into the position shown in Fig. 5, the upper end of said valve stem 48, projects upwardly thereagainst, and in open position, but when said handle is thrown into the opposite position the downwardly directed free end of said leaf spring bears upon the valve stem 48, thus thrusting the same downwardly and closing the valve, for in this position, the port 53, will register with the needle valve chamber E, and it is desirable that the flow of water be positively cut off.

Adjustable means are provided for insuring a simultaneous operation of the needle valve coincident with the opening and closing of the respective puppet valves. For this purpose, a double yoke 63, is integrally formed upon the upper side of the upper puppet valve 56, and extending loosely therethrough and resting upon rollers 64, are pivotally mounted cranks 65, each one of which extends through a slot in the upper portion of one of said needle valves 25, and acts, when moved upwardly, to contact said anti-friction ball element 29, to raise the respective needle valve, into open position. An adjustable pivotal mounting for each of said cranks 65, is provided and consists of a rod 66 slidable in a horizontal aperture over each of the float chambers in said cover 2, and a pin 67, serves to afford a pivotal connection between said crank 65, and said rod.

Thus it is readily seen that inasmuch as the amplitude of movement of the needle valve effected through a pivotal movement of said crank 65, is dependent upon the distance of said needle valve from the pivot point of said crank, that any desired opening of the needle valve may be effected by properly adjusting said rod 66, to or from the needle valve, and locking the same in adjusted position by means of a set screw 68. In order to control the flow of mixture from the carbureter, a butterfly throttle valve 69, is provided, being pivotally mounted in the cover casing 2, of the device, in position above the bell chamber H, and rigidly connected to said valve on the outer side of the casing, is an actuating lever 70. This mechanism constitutes the throttle device for the carbureter.

It is obvious, that whatsoever the mixture being formed within the mixing chamber, whether it be due to a carburation by gasolene or kerosene, the quantity of mixture flowing from the device, is governed entirely by the throttle valve 69. Integrally formed upon the cover casing 2, on the upper portion thereof, is an extended attaching flange 71, adapted to be connected to the intake manifold of an internal combustion engine, this connection also serving to support the carbureter in the desired position.

Means are provided for limiting the upward movement of the floats 18, in the respective float chambers, and this comprises apertured lugs 16ª formed on the outer surfaces of the cover casing, and each co-axially disposed above the stem 16, in the float chamber, said stems extending loosely into said apertured lugs and guided thereby.

Threaded inwardly into the upper ends of each of said apertured lugs from the outer side of said cover casings, are hollow closure pins 72, having a transverse aperture in the upper end thereof, adapted to be engaged by a pin to suitably adjust the closure pin in the aperture to thereby afford a stop for the float stem in its upward movement. Mechanism is also provided to limit the inward and outward movement of the adjusting rods 66. For this purpose, each of said adjusting rods 66, are provided with a longitudinal recess in one side thereof, and a horizontally directed set screw 73, is threaded inwardly through the cover casing inclosing said adjusting rods 66, and is engaged within said recess in said rods to thereby limit the inward and outward movement thereof and prevent accidental withdrawal during adjustment or other movements of the same.

The operation is as follows:

The class of internal combustion engines, to which this carbureter is adapted, requires a preliminary running or warming up before it will properly receive and explode a charge formed from a heavy hydrocarbon, and for this purpose the lever 55, is thrown into a position over the letter G, marked on the outer front side of the carbureter casing, this position indicating that the port 53, in the port element 52, is in register with the needle valve chamber E, thus affording communication therebetween and the mixing chamber C, and permitting carburation of the air by the hydro-carbon fluid, (in this case gasolene), from the float chamber A.

After the engine has been operated sufficiently long to become warmed, and capable of receiving a mixture formed from a heavier hydro-carbon, such as kerosene, the actuating handle is thrown into the opposite position over the indication K, and, when such is the case, the port 54, in said port element 52, registers with the needle valve chamber F, thus affording communication therebetween and the mixing chamber C, and effecting a carburation of the air by the heavier hydro-carbon. Reference to Fig. 5, will disclose that the port 54, is of slightly greater length than the port 53. This is for the purpose of effecting communication between the needle valve chamber I, which controls the flow of water or water vapor to the mixing chamber, it being desirable to admit water vapor to the mixing chamber simultaneously with the introduction of a vapor from a heavy hydro-carbon.

In order to insure a preliminary carburation of the air directly at the needle valves, auxiliary air ports 74, are formed integral upon the carbureter casing, and permit a direct entrance of the air over the respective needle valves into the auxiliary carbureting chambers E and F respectively. When the actuating handle 55, is over the indication G, or that permitting communication between the gasolene carbureting mechanism in the device and the motor, the spring element 62, bears downwardly upon the valve stem 48, of the needle valve in the lower portion of the carbureter, thus positively cutting off the flow of water from the device.

However, when the lever 55, is thrown into the position over the indication K, the needle valve stem 48, is released and under the impulse of its spring, the valve opens, thus permitting a flow of water to the secondary needle valve 40. It is obvious that the draft in the intake manifold due to the suction stroke of the various pistons of the engine, will tend to lift the puppet valves 56, and the effectiveness of such suction, of course, being controlled by the butterfly valve 69, governing the flow of mixture to the intake manifold.

When said puppet valves rise upwardly, due to the draft thereon, the levers 65, are thereby elevated and rotated about their respective pivot points 67, thus causing a lifting of each of the needle valves 25, and, inasmuch as the needle valve 40, is connected to the needle valve 25, on the kerosene side of the carbureter, by means of the Z-member 39, said water needle valve 40, necessarily opens a like amount and simultaneously therewith. The dash pot G, is at all times filled with a hydro-carbon fluid, from the float chamber B, due to the passage 60, which affords communication therewith, and said dash pot, due to the piston 59, therein, connected upon the valve stem 58, prevents a fluttering of the puppet valves 56 and 57.

The initial position of the needle valve 25, in the chamber E, is determined by the adjustment of the fluted cap 27, movement thereof serving to thread the stem 26, in or out of the apertured end of the valve 25, to raise or lower the same upon its seat, as the case may be. Likewise, a similar adjustment is effected upon the valve 25, in the chamber F, by suitably rotating the head 36, which causes the stem 26, to thread inwardly or outwardly in the valve stem 25, similar to that already described with reference to the chamber E.

Air is supplied to the mixing chamber C, through the inlet port or chamber D, and a correct amount of air is admitted to the mixing chamber, dependent upon the draft of the engine, inasmuch as the puppet valve 56, is raised upwardly, dependent upon said draft, the valve 57, is constrained to move therewith, so that an automatic governing device for supplying air to the mixing chamber is thus afforded.

I am aware that various details of construction may be varied through a wide range, as, for instance, positively actuating the needle valve and connecting the same with the throttle valve, or inserting positively, manually operatable valves in the air intake of the carbureter, but such variations from my invention may be made without departing from the principles thereof. I therefore do not purpose limiting the patent granted otherwise than necessitated by the prior art.

I claim as my invention:

1. In a carbureter of the class described a plurality of float chambers, a common mixing chamber therefor, a plurality of simultaneously actuatable needle valves, puppet valves in said mixing chamber, connections on said puppet valves adapted to operate all of said needle valves, a rotatable element for establishing communication between the respective float feed chambers and said mixing chamber, a needle valve for controlling the flow of a fluid to one of said needle valves, mechanism connected on said rotatable element adapted to close said latter needle valve, and a throttle valve for controlling the flow of mixture from the carbureter.

2. In a device of the class described a mixing chamber, connected inlet and outlet puppet valves therein, a plurality of float chambers, a plurality of needle valve chambers communicating therewith, needle valves, in said needle valve chambers to govern the flow therethrough, auxiliary air ports for each of said hydro-carbon needle valve chambers, a water needle valve communicating with said mixing chamber, means connecting one of said hydro-carbon valves with said water needle valve to insure simultaneous operation thereof, and a rotatable element for cutting off communication between one of said hydro-carbon needle valves, and for opening communication with another of said needle valves and said water needle valve, with said mixing chamber.

3. In a device of the class described a mixing chamber, connected puppet valves controlling the inlet and outlet thereof, an inlet-water needle valve, a plurality of hydro-carbon needle valves, connections on said puppet valves adapted to operate said latter needle valves, mechanism connected to one of said hydrocarbon needle valves and to said water needle valve to insure simultaneous opening thereof, and means for adjusting each of said needle valves relative the actuating mechanism therefor.

4. In a device of the class described a mixing chamber, a plurality of float chambers connected therewith, a plurality of hydro-carbon needle valves adapted to control the flow of fluid from said float chamber to said mixing chamber, a needle valve adapted to admit water vapor into said mixing chamber, a positively actuated needle valve adapted to control the flow of water to said water needle valve, a ported element adapted to establish communication, between the respective float feed chambers and said mixing chamber, means connected on said ported element adapted to operate said first water needle valve, and means controlling the flow of liquid therefrom.

In testimony whereof I have hereunto subscribed my name in the presence of two subscribing witnesses.

CHARLES L. RAYFIELD.

Witnesses:
CHARLES W. HILLS, Jr.,
LEON M. REIBSTEIN.